United States Patent [19]

Nomine et al.

[11] 4,123,043
[45] Oct. 31, 1978

[54] GAS CLEANING SYSTEM FOR METALLURGICAL APPARATUS

[75] Inventors: Harold Nomine, Essen, Fed. Rep. of Germany; Eberhard G. Schempp, Pittsburgh, Pa.

[73] Assignee: Pennsylvania Engineering Corporation, Pittsburgh, Pa.

[21] Appl. No.: 830,614

[22] Filed: Sep. 6, 1977

Related U.S. Application Data

[62] Division of Ser. No. 647,112, Jan. 7, 1976, Pat. No. 4,081,269.

[51] Int. Cl.² .............................................. C21C 5/40
[52] U.S. Cl. .................................................... 266/158
[58] Field of Search ........................... 122/7 A; 75/60; 266/142, 143, 158; 98/115 R

[56] References Cited

U.S. PATENT DOCUMENTS 3,603,572  9/1971  Rosentern ................................ 75/60
3,908,969  9/1975  Baum et al. ............................ 266/89

Primary Examiner—Gerald A. Dost
Attorney, Agent, or Firm—Fred Wiviott

[57] ABSTRACT

A pair of metallurgical vessels are each coupled by a gas collecting hood having a movable skirt to a gas cleaning system which includes an exhaust fan and a quencher and scrubber each having flow varying means. Each vessel is surrounded by an enclosure having an access door toward which the open upper end of the vessel may be tilted for receiving a metal charge. A secondary gas collecting hood is disposed in each enclosure above the access door for creating an indraft when the door is open. A valve system permits the selective connection of the secondary hood of one enclosure to the fan of the other to increase the indraft during furnace charging, sampling and pouring.

10 Claims, 5 Drawing Figures

GAS CLEANING SYSTEM FOR METALLURGICAL APPARATUS

This is a division of application Ser. No. 647,112, filed Jan. 7, 1976, U.S. Pat. No. 4,081,269, granted Mar. 28, 1978.

BACKGROUND OF THE INVENTION

This invention relates to a gas cleaning system for metallurgical vessels.

Pneumatic metallurgical vessels are commonly employed for converting pig iron to steel. These vessels generally include an open upper end for receiving a metallic charge and tuyeres or lances for delivering oxygen or an oxygen containing gas to the metallic charge for the oxidation of such impurities as carbon, phosphorous and silicon. As a result of the reactions within the vessel pollutant gases such as carbon monoxide and particulate material may be discharged from the upper end of the vessel.

One type of pneumatic steel conversion apparatus, commonly called Q-BOP, includes an open topped vessel having tuyeres extending through its lower end for injecting oxygen beneath the level of molten metal within the vessel. In addition, a hydrocarbon shielding fluid, such as propane, manufactured gas, natural gas or light oil, is injected in surrounding relation to the oxygen for prolonging the life of the tuyeres and the surrounding vessel refractory. As a result of the reactions within the vessel and the disassociation of the shielding fluid, pollutant gases and particulate material are discharged from the open upper end of the vessel. Another type of metallurgical vessel is the BOF furnace where oxygen is blown from a lance onto the upper surface of the metal bath causing the discharge of gases such as carbon monoxide and a brown iron-containing smoke.

In order to prevent the discharge of such pollutants, Q-BOP and BOF vessels are commonly provided with a smoke hood coupled to a gas cleaning system. Smoke hoods of this type are normally disposed above the upper end of the vessel and may include a skirt which is movable into and out of close proximity with the vessel opening.

When Q-BOP vessels, for example, are tilted away from the smoke hood for sampling and tapping, a gas, normally nitrogen, must be injected through the furnace tuyeres to prevent the backflow of liquid metal. An enclosure is often provided for containing the fumes which normally discharge from the vessel during such periods. In addition, when the vessel is being charged with liquid hot metal or scrap through a door in the enclosure, a secondary gas emission occurs which must also be controlled. One apparatus for collecting such fumes includes a secondary gas collecting hood which opens into the enclosure and is disposed above the access door for creating an indraft so that the secondary fumes do not pass out of the enclosure. Secondary hoods of this type are connected by a selectively operable valve or damper to the same gas cleaning system as the primary hood. In order for the secondary hood system to be effective, the flow rate of air inwardly through the open access door must be relatively high in order to prevent the outflow of gases emanating from the tilted vessel. Other types of pneumatic metallurgical vessels, such as BOF furnaces, Kaldo, Bessemer and Thomas converters, and argon-oxygen vessels also require emission collectors in varying degrees during blowing and non-blowing stages of their respective process cycles.

SUMMARY OF THE INVENTION

It is an object of the invention to provide a new and improved gas cleaning system for pneumatic converter vessels.

Another object of the invention is to provide a gas cleaning system which produces a high air velocity indraft at the access opening of the enclosure surrounding a pneumatic metallurgical converter vessel.

These and other objects and advantages of the invention are achieved by a gas cleaning system surrounded by an enclosure wherein a secondary hood opening into the enclosure is selectively connectable to the furnace gas cleaning system and to the exhaust fan of an idle furnace gas cleaning system.

DETAILED DESCRIPTION OF THE PREFERRED EMBODIMENTS

Figure 1:
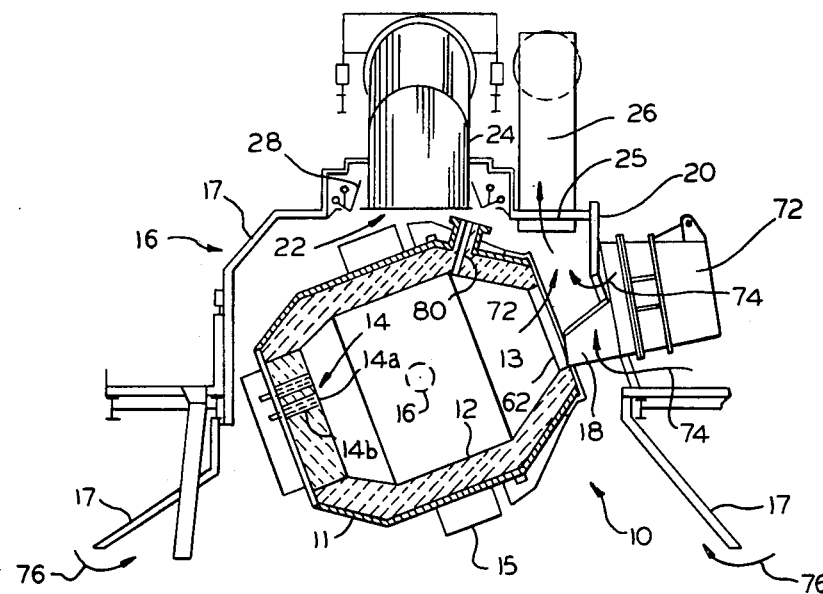
FIG. 1 is a side elevational view, partly in section, of a metallurgical vessel and enclosure with which the present invention is applicable.

FIG. 1 shows a metallurgical vessel 10 to which the present invention is applicable, and which may, for example, be of the bottom blown or Q-BOP type. The vessel 10 includes a metallic shell 11 and a refractory lining 12 which has an opening 13 at its upper end. A plurality of tuyeres 14 extends through the lower end of the vessel 10 and each tuyere includes an inner tuyere pipe 14a and an outer tuyere pipe 14b to permit the injection of oxygen and a surrounding sheet of hydrocarbon shielding fluid as will be discussed more fully below. Converter vessels of the type illustrated are generally supported in a conventional manner on a trunnion ring 15 which has a trunnion pin 16 extending from each of its opposite sides. Trunnion pins 15 are suitably supported in a well-known manner on conventional bearing structures (not shown) and are coupled to a suitable drive mechanism (not shown) for tilting the vessel to each of a plurality of positions as may be required during a process cycle.

The vessel 10 is shown in FIG. 1 to be disposed within a metallic enclosure 156 having a skirt portion 17 which extends downwardly below the vessel and an access opening 18 formed in one side toward which the vessel 10 is tiltable. A closure door 20 is mounted adjacent the access opening and is horizontally movable into open and closed positions relative to the opening as may be required during a conversion cycle.

A top opening 22 is formed in enclosure 16 for receiving a smoke hood 24 which is preferably water cooled in any suitable manner such as by being formed of a tubular membrane construction. Suitable water inlet and outlet headers (not shown) are connected to the tubes which form the hood 25. A second opening 25 is formed in enclosure 16 at a point above excess opening 18 for receiving the lower end of a secondary smoke hood 26. A movable skirt 28 is disposed in a telescoping relation around the lower end of primary hood 24 and is movable by means (not shown) into and out of close proximity to the opening 13 of vessel 10 as the latter is pivoted into and out of its various positions as will be discussed in greater detail below.

Figure 2:
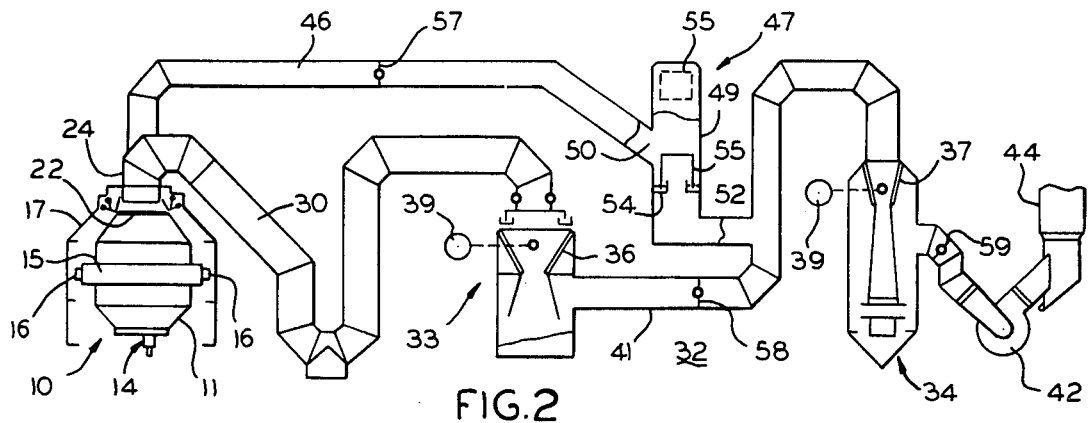
FIG. 2 schematically illustrates a gas cleaning system coupled to the enclosure illustrated in FIG. 1.

As schematically illustrated in FIG. 2, the primary smoke hood 24 is coupled by a conduit 30 to a gas cleaning system 32 which may, for example, include a quencher 33 and a scrubber 34. The quencher 33 and the scrubber 34 include variable throat venturies 36 and 37 respectively. As those skilled in the art will appreciate, the opening in each venturi may be varied by a suitable control motor 39. A water-cooled conduit 30 connects the inlet of quencher 33 to the hood 24 and a second conduit 41 connects the outlet of quencher 33 to the inlet of gas scrubber 34. In addition, as induced draft fan 42 is connected to the outlet of gas scrubber 34 and to a flare stack 44. The secondary smoke hood 26 is connected through a bell damper 47 to conduit 41 between quencher 33 and gas scrubber 34. Bell damper 47 is provided for connecting and disconnecting secondary smoke hood 26 to gas cleaning system 32 and includes a generally vertical housing 49 having an inlt 50 connected to conduit 46 and an outlet 52 connected to conduit 41. A water trough 54 is disposed in the interior surface of housing 47 between inlet 50 and outlet 52 and is adapted to have water circulated continuously therethrough. An inverter hollow bell member 55 is movable vertically in housing 49 and between a closed position shown by full lines in FIG. 2 wherein its lower peripheral edge is immersed beneath the water in trough 54 and an open position shown by broken lines wherein member 55 is above inlet 50. It will be appreciated that when bell 55 is in its open position shown by broken lines, secondary hood 26 is connected to the gas cleaning system 32 whereas movement of bell 55 to its closed position shown by full lines will disconnect the secondary hood 26 from the system 32. In addition, a first maintenance damper 57 is disposed in conduit 46 between secondary hood 26 and bell damper 47, a second maintenance damper 58 is disposed in conduit 41 between quencher 33 and the outlet 52 of damper 47 and a third damper 59 is disposed at the inlet of fan 42.

As those skilled in the art will appreciate, quencher 33 is of the water spray type where coarse dust particles are separated from the gas stream and scrubber 34 is of the high energy water spray type wherein the fine fraction of dust particles are removed.

Figure 3:
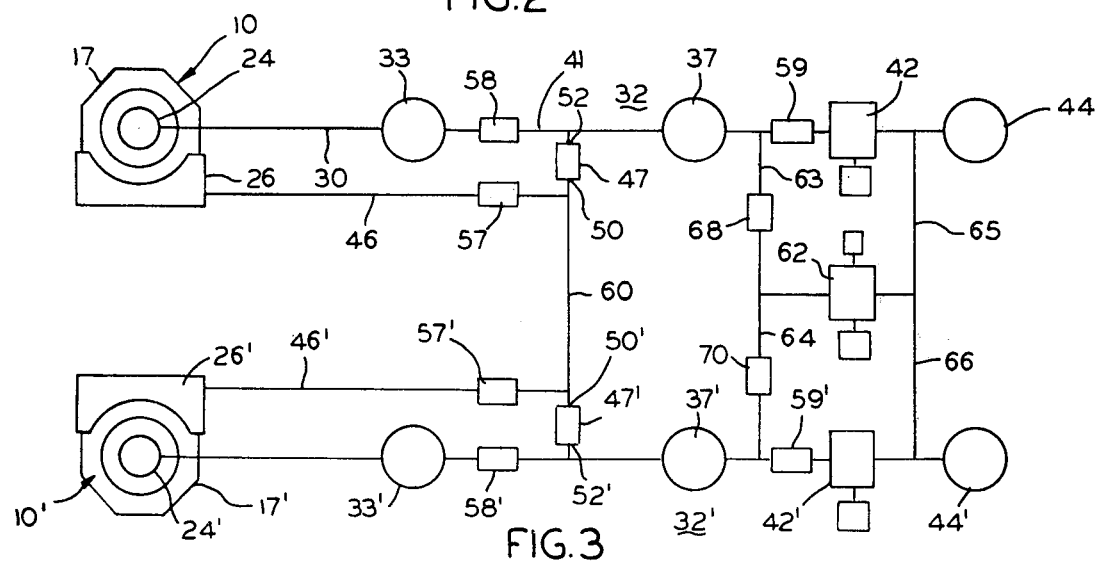
FIG. 3 schematically illustrates the gas cleaning system according to the present invention.

FIG. 3 shows a second vessel 10', enclosure 17', primary and secondary smoke hoods 24' and 26' and a gas cleaning system 32' disposed in spaced apart parallel relation to the first vessel 10 and gas cleaning system 32. All of the compounds of the second system are identical to those of the first system and accordingly, each bears the same reference numeral which is distinguished by a prime('). The gas cleaning system 32 is shown to be connected to the gas cleaning system 32' by a conduit 60 which interconnects the inlets 50 and 50' of the bell dampers 47 and 47'. In addition, a third exhaust fan 62 may be connected by conduits 63 and 64 to the outlets of gas scrubbers 37 and 37' while the outlet of fan 62 is connected by conduits 65 and 66 to the stacks 44 and 44' respectively. Maintenance dampers 68 and 70 may be connected in conduits 63 and 64 respectively so that the fans 62 may be disconnected from one or both of the gas cleaning systems 32 and 32'.

In a normal operating situation, the vessels 10 and 10' would each be operated on cycles of alternate periods of production and to permit the performance of routine maintenance. For example, such cycles may include 8 hours of production time followed by 4 hours or idle time or 16 hours of production followed by 8 hours of idle time. Normally, the idle periods for the two vessels 10 and 10' will be alternated so that at least one vessel will be in operation at all times.

Assume, for the purposes of illustration that vessel 10 is being operated and that vessel 10' is idle. The first step in the steel making process of the illustrated apparatus is the charging of vessel 10 with scrap. For this purpose, the vessel is initially tilted to its position shown in FIG. 1 wherein its open upper end 13 is disposed adjacent the opening 18 and the access door 20 of enclosure 17 is open. Scrap metal is then charged into the furnace by means of a chute (not shown). During this period, there are not normally any emissions from the vessel 10. Next, hot metal is charged into the vessel through a hot metal charging ladle 72 during which time the tuyeres 14 are preferably not immersed in the metal charge as it is being poured into the vessel 10 to minimize agitation which could result in unnecessary reactions of the hot metal with the scrap. However, even with these precautions, there will be cases when emissions from the vessel 10, symbolized by arrows 72, are unavoidable and accordingly, the gas cleaning systems 32 and 32' will be operated accordingly. During hot metal charging, therefore, it is desirable to create an indraft at the access opening 18 of enclosure 17. This is accomplished by closing the variable throat 36 in quencher 33 to minimize the air flow through hood 24. In addition, the bell damper 47 and the two maintenance dampers 57 and 58 are open. On the idle side, the variable throat in quencher 33 is closed as are the two maintenance dampers 57' and 58' while the bell damper 47' is open. In both the operating and idle systems the scrubbers 37 and 37' and the dampers 59 and 59' are in their full open, high flow positions. In this manner, a substantially greater air flow, symbolized by arrows 74, is achieved through the access opening by the application of the fans 42 and 42' from the operating and idle systems to the secondary hood 25 of the furnace being charged. It is important that not only the volume of air flow to the secondary hood 26 be sufficient, but the velocity of the air 74 flowing inwardly through opening 18 should be sufficient to overcome the inertia of the gas 72 and the particles exiting vessel 10. The closing of maintenance dampers 57' and 58' in the idle system protects workers who may be servicing the idle vessel 10'. Some air also flows around the lower end of skirt 17, as symbolized by arrows 76, to insure that the gases 72 do not flow downwardly and around the lower end of enclosure 17.

After the hot metal charging has been completed, the closure door 20 is closed and the vessel 10 is rotated to a vertical position with its top opening 13 disposed immediately below the movable skirt 28 as seen in FIG. 2. As the vessel is rotated, the hot metal charge will flow over the tuyeres 14 and accordingly, inert gases such as nitrogen or argon must be delivered to the tuyeres to prevent them from filling with metal. As a result, emissions will emanate from vessel 10 and these must be captured by the gas cleaning system. During vessel turnup, therefore, the quencher 33, the maintenance damper 58, the scrubber 37, and the fan inlet damper 59 of the operating gas cleaning system 32 are all in their open maximum flow positions. As a result, a substantial portion of vessel emissions are drawn into the primary hood 24. In order to insure maximum flow through primary hood 24, the bell damper 47 of the operating system 32 is closed. In the idle system 32', the quencher 33' and the maintenance dampers 57' and 58' are closed while the bell damper 47', the scrubber 37' and the fan inlet damper 59' are all in open positions. As a result, the maximum suction produced by fan 42' is applied to the secondary hood 26 of the operating system. As a result, maximum ventilation of the enclosure 17 is produced.

After turnup has been completed, and the vessel 10 is in a vertical position, the adjustable skirt 28 is lowered into close proximity with the vessel opening whereupon the main oxygen blow can commence. This consists of delivering oxygen to the inner tuyere pipe 14a and a hydrocarbon shielding fluid to the outer tuyere pipe 14b. The oxygen reacts with carbon, silicon and phosphorus in the furnace charge wherein these oxidized impurities are withdrawn either in off-gases or in a slag. In addition, fluxing agents such as lime may be entrained in the gas stream for the purpose of desulfurization. The hydrocarbon shielding fluid which may take the form of propane, natural gas, manufactured gas or light oil, prolongs the life of the tuyeres 14 and the surrounding refractory lining. During the main oxygen blowing period, the quencher 33, the scrubber 37 and the fan inlet damper 59 of the operating system are maintained in their fully open position. Substantially all of the gases evolved from vessel 10 are captured by the primary hood 24 and processed in the primary system 32. Normally, the fan 42 produces a negative pressure within the primary hood 24 so that there is a slight inflow of air through the small gap that exists between the vessel 10 and the movable skirt 28. Toward this end, the venturi 37 of the scrubber 34 is modulated to produce the desired negative pressure within hood 24. However, some gases may escape into enclosure 17 due to puffing and slopping around the opening 13 of vessel 10. For this reason, the idle system 32' is adjusted such that positive ventilation will be produced within enclosure 17. Specifically, the quencher 33' and the maintenance dampers 57' and 58' are enclosed while the bell damper 47' and the scrubber 37' are open. The fan inlet damper 57' is placed in a flow modulating position and the speed of fan 42 may be reduced.

After completion of the oxygen blow, the movable skirt 28 is elevated and the vessel 10 may then be rotated approximately to its position shown in FIG. 1 where the molten metal is sampled for chemistry and temperature through probes inserted through small openings (not shown) in the closure door 20. If the temperature and chemistry specifications are proper, the vessel 10 is rotated in a counterclockwise direction as viewed in FIG. 1 through the vertical position and toward a tapping position wherein the liquid metal may flow out of the tapping nozzle 80 and into a teaming ladle (not shown) positioned therebelow. During tapping of the vessel 10, alloying additions may be introduced into the ladle through a feed chute (not shown). While the vessel is being turned down for sampling and again when it is being turned up and down toward its tapping position, inert gases must be introduced into the tuyeres 14. In order to capture the emissions thus produced, the components of the systems 32 and 32' are placed in the same positions as during turnup after the hot metal charge as described above.

It will be appreciated that when vessel 10' is in operation and vessel 10 is idle the components of the systems 32 and 32' are reversed during various stages of operation. During periods when both vessels 10 and 10' are in operation at the same time, each of the systems 32 and 32' are in their operating modes so that if either vessel is in its main oxygen blowing period and its associated bell damper 47 or 47' is closed, the cross connection between the systems will not be achieved. The additional fan 62 is provided to insure continued operation in the event of failure of either of the fans 42 or 42' and in addition, may be employed to supplement the draft in either of the systems 32 or 32'.

Figure 4:
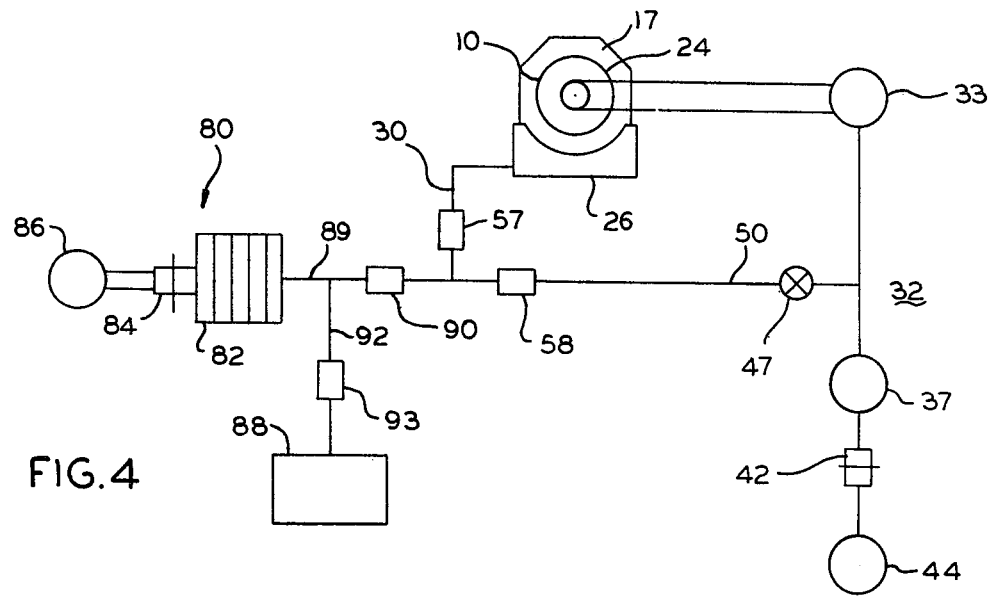
FIGS. 4 and 5 schematically illustrate an alternate embodiment of the invention.

FIG. 4 illustrates the application of the present invention to a system having a single metallurgical vessel 10 and its associated gas cleaning system 32. The system's secondary hood 26 is connected by a conduit 30 and maintenance dampers 57 and 58 to the bell damper 47.

The system also includes a dust collecting or gas cleaning system 80 whose primary function is to remove particulate matter or clean gases relative to other apparatus in the steel making facility. This system, for example, may include a gas cleaner or scrubber 82, a fan 84 and a stack 86. The gas scrubber 82 may take any convenient form such as a cyclone separator, a wet or dry type of precipitator or a bag type filter. The system 80 is normally provided to service a hood 88 which may be disposed, for example, over a reladling pit, or may be associated with another type of metallurgical apparatus. A first conduit 89 connects the scrubber 82 to the junction between conduits 30 and 50 through a maintenance damper 90 and a second conduit 92 connects the hood 88 through maintenance conduit 89.

During charging of hot metal to the vessel 10 of FIG. 4, the variable throat in quencher 33 is closed and the bell damper 47 and the maintenance dampers 57, 58 and 90 are open to connect the secondary hood 26 into both gas cleaning systems 32 and 80. At this time, it is preferable that the maintenance damper 93 be closed. After charging of the hot metal has been completed and the access doors to enclosure 17 have been closed, the vessel 10 is turned up while inert gas is delivered through the submerged tuyeres. During this time, the bell damper 47 and the maintenance damper 58 are closed to isolate the secondary hood 26 from the gas cleaning system 32 so that maximum flow can be achieved through primary hood 24. Dampers 57 and 90, however, remain open so that the secondary hood is connected to the system 80. After the vessel returns to its upright position and the skirt of hood 24 is lowered into position, the main oxygen blow may commence. The maintenance dampers 57 and 90, however, may be kept open to produce ventilation of the enclosure 17. During this time, damper 93 may also be opened to connect the hood 88 to the system 80.

Figure 5:
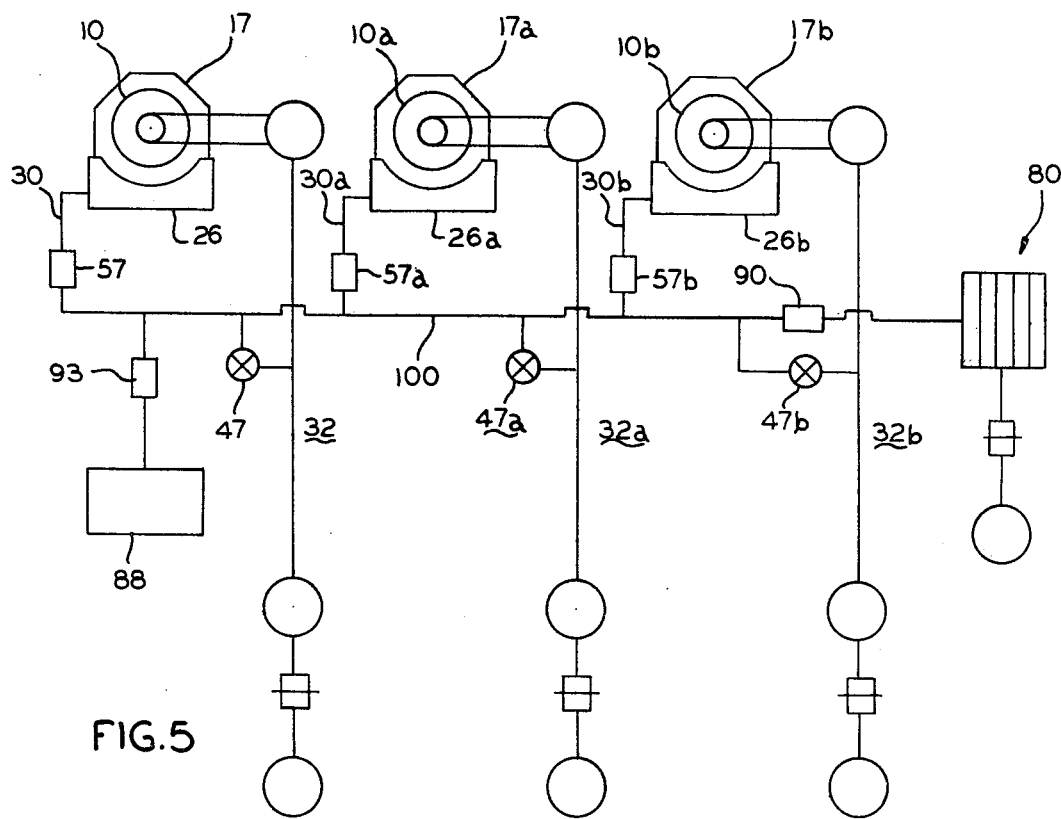

FIG. 5 shows yet an alternate embodiment of the present invention wherein three vessels 10, 10a and 10b are shown to be enclosed in enclosures 17, 17a and 17b which are respectively associated with gas cleaning systems 32, 32a and 32b. The individual systems are identical with those discussed with respect to FIG. 3 and accordingly will not be described in detail. Each of the secondary hoods 26, 26a and 26b are respectively connected by conduits 30, 30a and 30b to a common conduit 100. Bell dampers 47, 47a and 47b respectively connect the common conduit 100 to the corresponding gas cleaning systems 32, 32a and 32b. Also connected to common conduit 100 is a hood 88 through maintenance damper 93 and the gas cleaning system 80 through maintenance damper 90. The system illustrated in FIG. 5 permits all three of the vessels 10, 10a and 10b to be operated simultaneously. In this event, the system 80 can be coupled to any combination of the secondary hoods 26, 26a and 26b by operation of the maintenance dampers 57, 57a and 57b so as to provide the necessary indraft. This connection would be accomplished, of course, during those portions of the process cycle when an indraft in the secondary hood is necessary as indicated with respect to the discussion of the system of FIG. 3.

While the invention has been illustrated and described with respect to vessels of the bottom blown or Q-BOP type, those skilled in the art will appreciate that it has application to other types of pneumatic steel making or converter vessels as well. Also, while only a few embodiments of the prevent invention are illustrated and described, it is not intended to be limited thereby but only by the scope of the appended claims.

We claim:

1. A metallurgical system comprising first and second metallurgical vessels each having tuyere means for injecting process fluids beneath the level of metal contained with each vessel and each having an opening formed therein through which exhaust gases discharge,
   first and second enclosure means respectively surrounding at least the upper portions of said first and second vessels, first and second primary gas collecting means extending respectively through each enclosure and positioned to collect gases discharging from its associated vessel when the latter is in a normal process position,
   an access opening formed in each enclosure and closure door means for selectively opening and closing said access opening,
   said vessels being tiltable about generally horizontal axes for movement from a normal operating position and toward said access openings whereby said vessels may receive a metallic charge,
   first and second secondary hood means coupled respectively, to said first and second enclosures,
   first and second gas cleaning systems respectively connected to said first and second primary hood means and each including means for removing particulate from the exhaust gases and gas flow producing means,
   and selectively operable coupling means for selectively coupling said first secondary hood means to said first or second gas cleaning systems and said second secondary hood means to said first or second gas cleaning systems.

2. The apparatus set forth in claim 1 wherein each of said gas cleaning systems includes first and second serially connected gas cleaning means each having an inlet and an outlet, said coupling means being operable to connect said first and second secondary hood means to the inlets of the second gas cleaning means of each of said first and second gas cleaning systems.

3. The apparatus set forth in claim 2 wherein the first gas cleaning means of each of said first and second gas cleaning systems is provided with adjustable flow control means whereby the flow through each of said first gas cleaning means may be restricted, the inlets of each of said first gas cleaning means being connected to its respective first and second primary gas collecting means.

4. The apparatus set forth in claim 3 wherein said coupling means comprises first and second valve means, each of said valve means having an inlet connected to one of the secondary gas collecting means and an outlet connected to its respective gas cleaning system, and conduit means interconnecting the inlets of each of said first and second valve means.

5. The apparatus set forth in claim 4 wherein each of said second gas cleaning means includes means for modulating the flow therethrough, each of said exhaust means comprises fan means, the outlet of each of said second gas cleaning means being connected to its respective gas flow producing means.

6. The apparatus set forth in claim 5 wherein each of said gas cleaning systems includes second and third valve means, each of said second valve means being connected between the respective secondary gas collecting means and said conduit means and each of said third valve means being connected between the respective first gas cleaning means and the outlet of said first valve means.

7. A metallurgical system comprising a metallurgical vessel having tuyere means for injecting process fluids beneath the level of metal contained within the vessel and an opening formed in said vessel through which exhaust gases discharge,
   enclosure means surrounding at least the upper portions of said vessel, primary gas collecting means extending through said enclosure and positioned to collect gases discharging from said vessel when the latter is in a normal process position,
   an access opening formed in said enclosure and closure door means for selectively opening and closing said access opening,
   said vessel being tiltable about a generally horizontal axis for movement from a normal operating position and toward said access opening whereby said vessel may receive a metallic charge,
   a secondary hood means coupled to said enclosure, a gas cleaning system connected to said primary hood means and including first and second serially connected gas cleaning means for removing particulate from the exhaust gases and each having an inlet and an outlet, said gas cleaning system also including gas flow producing means,
   a second gas cleaning system having gas flow producing means,
   and selectively operable coupling means for selectively connecting and disconnecting said secondary hood means to the inlet of said first gas cleaning means and for connecting and disconnecting said secondary hood means to said second gas cleaning system.

8. The apparatus set forth in claim 7 wherein the first and second gas cleaning means are provided with adjustable flow control means whereby the flow through each of said gas cleaning means may be restricted, the inlet of said first gas cleaning means being connected to said primary gas collecting means, said gas flow producing means comprising fan means having an inlet connected to the outlet of said second gas cleaning means, said coupling means comprising valve means having an inlet connected to said secondary hood means and an outlet connected to the inlet of said second gas cleaning means, and conduit means interconnecting the inlet of said valve means to said second gas cleaning system.

9. A metallurgical system comprising a metallurgical vessel having means for delivering process fluids to molten metal contained within the vessel and an opening formed in said vessel through which exhaust gases discharge, enclosure means surrounding at least the upper portions of said vessel, primary gas collecting means extending through said enclosure and positioned to collect gases discharging from said vessel when the latter is in a normal process position, an access opening formed in said enclosure, closure door means for selectively opening and closing said access opening, said vessel being tiltable about a generally horizontal axis for movement from a normal operating position and toward said access opening whereby said vessel may receive a metallic charge, a secondary hood means coupled to said enclosure, a gas cleaning system connected to said primary gas collecting means and including first and second serially connected gas cleaning means for removing particulate from the exhaust gases and each having an inlet and an outlet, said gas cleaning system also including gas flow producing means, a second gas cleaning system having gas flow producing means, and selectively operable coupling means for selectively connecting and disconnecting said secondary hood means to the inlet of said second gas cleaning means and for connecting and disconnecting said secondary hood means to said second gas cleaning system.

10. A metallurgical system comprising a plurality of metallurgical vessels each having gas delivery means for delivering processed fluids to molten metal contained within each vessel and each having an opening formed therein through which exhaust gases discharge, a plurality of enclosure means, each enclosure means respectively surrounding at least the upper portions of one of said vessels, a plurality of primary gas collecting means each associated with one of said enclosure means and positioned to collect gases discharging from its associated vessel when the latter is in a normal process position, an access opening formed in each enclosure, closure door means for selectively opening and closing each access opening, said vessels being tiltable about generally horizontal axes for movement from a normal operating position and toward said access opening whereby said vessels may receive a metallic charge, a plurality of secondary hood means each respectively associated with one of said enclosures, a plurality of gas cleaning systems each respectively connected to the primary gas collecting means in one of said enclosures and each including means for removing particulate from the exhaust gases, and gas flow producing means, selectively operable coupling means for selectively coupling each secondary hood means to its associated gas cleaning system and to another gas cleaning system associated with a different one of said secondary hood means.

* * * * *